(12) United States Patent
Nagarajan et al.

(10) Patent No.: US 10,996,860 B2
(45) Date of Patent: May 4, 2021

(54) METHOD TO IMPROVE MIXED WORKLOAD PERFORMANCE ON STORAGE DEVICES THAT USE CACHED OPERATIONS

(71) Applicant: Intel Corporation, Santa Clara, CA (US)

(72) Inventors: Suresh Nagarajan, Folsom, CA (US); Shankar Natarajan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/176,465

(22) Filed: Oct. 31, 2018

(65) Prior Publication Data

US 2019/0065075 A1    Feb. 28, 2019

(51) Int. Cl.
*G06F 3/06* (2006.01)

(52) U.S. Cl.
CPC .......... *G06F 3/0613* (2013.01); *G06F 3/0656* (2013.01); *G06F 3/0659* (2013.01); *G06F 3/0679* (2013.01)

(58) Field of Classification Search
CPC ............... G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153

See application file for complete search history.

(56) References Cited

U.S. PATENT DOCUMENTS

| | | | | |
|---|---|---|---|---|
| 6,092,158 | A  * | 7/2000 | Harriman | G06F 13/1642 710/240 |
| 6,738,831 | B2 * | 5/2004 | Wolrich | G06F 13/1626 710/5 |
| 8,495,259 | B2 * | 7/2013 | Bakke | G06F 3/061 710/22 |
| 8,656,213 | B2 * | 2/2014 | Bakke | G06F 11/0727 714/6.1 |

(Continued)

OTHER PUBLICATIONS

H. Li, P. Huang and C. Xie, "Regional Scheduler: A Region-based High Efficient Solid State Drive Scheduler," 2012 IEEE 15th International Conference on Computational Science and Engineering, Nicosia, 2012, pp. 516-523 (Year: 2012).*

*Primary Examiner* — Daniel C. Chappell
(74) *Attorney, Agent, or Firm* — Schwabe, Williamson & Wyatt, P.C.

(57) ABSTRACT

An apparatus for controlling a solid state drive (SSD) includes an host interface, to receive a set of memory access commands from a host computer, and processing circuitry coupled to the host interface and to memory cells of the SSD, to distinguish the write commands from the read commands in the set, and execute up to a threshold number of the write commands prior to executing any of the read commands.

15 Claims, 8 Drawing Sheets

(56) References Cited

U.S. PATENT DOCUMENTS

| | | | | |
|---|---|---|---|---|
| 9,021,178 B2* | 4/2015 | Guda | .................. | G06F 3/061 |
| | | | | 711/103 |
| 9,971,546 B2* | 5/2018 | Shen | .................. | G06F 3/061 |
| 10,522,185 B1* | 12/2019 | Hall | .................. | G06F 3/0676 |
| 10,613,764 B2* | 4/2020 | Bhargava | .............. | G06F 3/0611 |
| 10,846,253 B2* | 11/2020 | Shen | ................... | G06F 3/0659 |
| 2005/0055517 A1* | 3/2005 | Olds | ................... | G11B 19/02 |
| | | | | 711/158 |
| 2014/0089569 A1* | 3/2014 | Pignatelli | ............. | G06F 3/0611 |
| | | | | 711/103 |
| 2016/0179404 A1* | 6/2016 | Nanduri | ................. | G06F 3/061 |
| | | | | 711/103 |
| 2018/0232311 A1* | 8/2018 | Bhati | ................. | G06F 12/0811 |
| 2019/0303324 A1* | 10/2019 | Lantz | .................... | G06F 13/364 |

\* cited by examiner

METHOD TO IMPROVE MIXED WORKLOAD PERFORMANCE ON STORAGE DEVICES THAT USE CACHED OPERATIONS

FIELD

Embodiments of the present disclosure relate to improving throughput of memory devices, and in particular to separating write and read commands received from a host computer, and separately executing blocks of each command type.

BACKGROUND

Modern client solid state devices (SSDs) use cached commands for both read and write operations to maximize performance. For SSD capacities that have, for example, a single die per channel, caching of memory commands may provide a fifty percent (50%) increase in throughput per unit time. While a read only workload, or a write only one, may benefit from memory command caching, a mixed workload of both read and write commands may not. This is because the cached commands in such a mixed workload are repeatedly interrupted by a change in operations. For example, a cached read is interrupted by a new write instruction, and a cached write is interrupted by a new read instruction.

DETAILED DESCRIPTION

Figure 1:
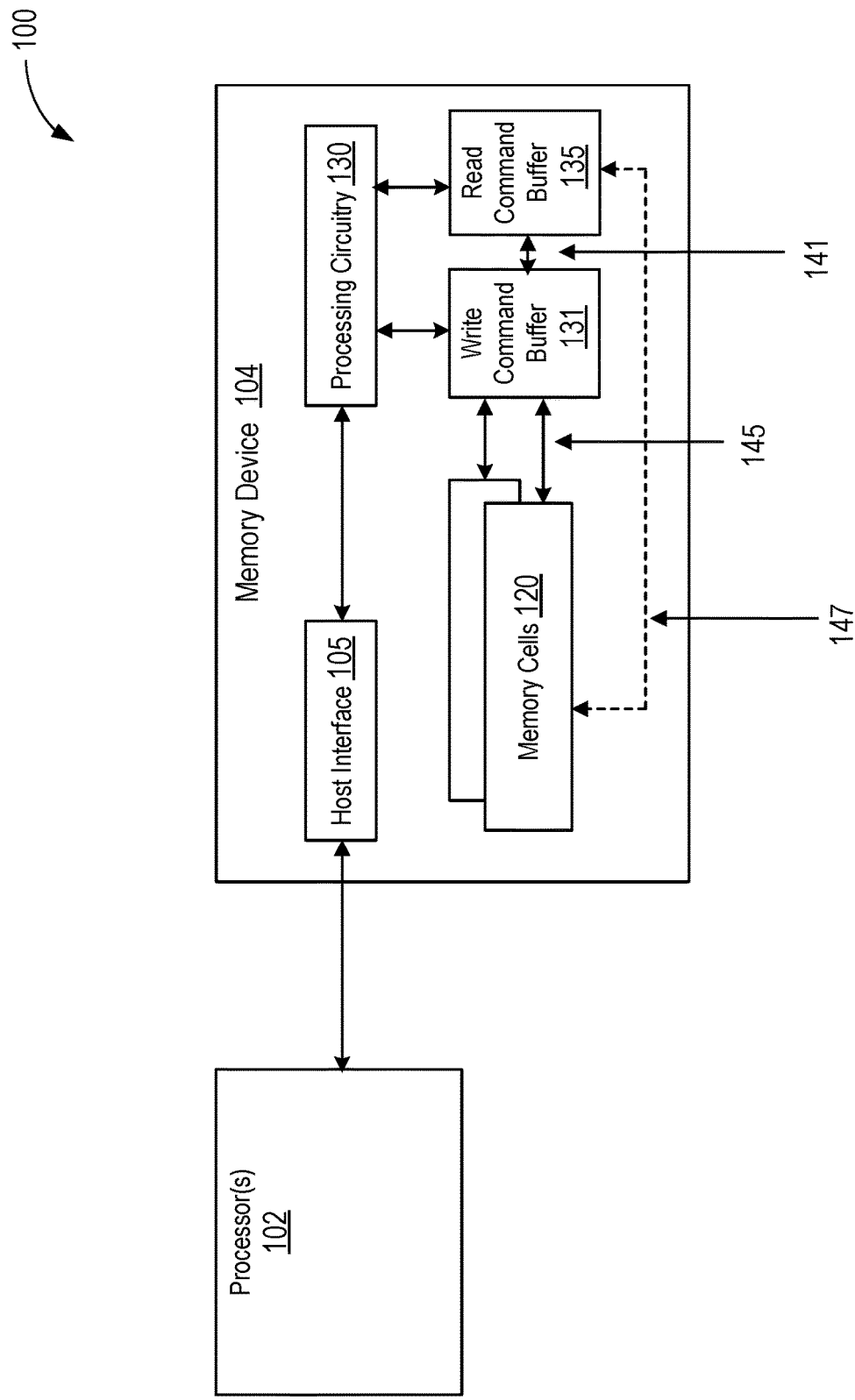
FIG. 1 illustrates an exemplary system, in accordance with various embodiments.

In embodiments, an apparatus for controlling an SSD includes an host interface, to receive a set of memory access commands from a host computer, and processing circuitry coupled to the host interface and to memory cells of the SSD, to separate the set into write commands and read commands, and execute up to a threshold number of the write commands prior to executing any of the read commands.

In embodiments, one or more non-transitory computer-readable storage media include a set of instructions, which, when executed by a SSD controller coupled to memory cells of a SSD, cause the SSD controller to receive a set of read and write commands from a host computer, and separate the set into write commands and read commands. In embodiments, the instructions, when executed, further cause the SSD controller to execute up to a threshold number of the write commands prior to executing any of the read commands.

In embodiments, a memory device includes a NAND die that has at least one memory cell, and a SSD controller. The SSD controller has a host interface to receive a set of memory access commands from a host computer, and processing circuitry coupled to the host interface and to the at least one memory cell, to segregate the set into write commands and read commands. In embodiments, the SSD controller executes up to a threshold number of the write commands prior to executing any of the read commands.

In the description to follow, reference is made to the accompanying drawings which form a part hereof wherein like numerals (or, as the case may be, the last two digits of an index numeral) designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term computer device may refer to a client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

In embodiments, a host device may send to a memory device, such as, for example, a SSD, a series of memory access commands. These commands, in general, include both read (from memory) commands as well as write (to memory) commands, in what is known as a "mixed workload." It is most efficient to process a mixed workload of memory commands out of order, i.e., to process a batch of write commands, and then a batch of read commands, to maximize caching of operations.

FIG. 1 illustrates an exemplary system 100, in accordance with various embodiments. With reference thereto, processor 102, in the course of its operation, may issue memory commands, including read and write commands, to memory device 104. The memory commands may include commands to, respectively, read data from memory locations of memory device 104, or write data from processor 102 to memory locations in memory device 104. In embodiments, the set of commands issued by processor 102 may be "mixed", including both read and write commands temporally interspersed. The memory commands issued by processor 102 may be received on memory device 104 by host interface 105, which stores the memory commands pending further processing by memory device 104.

Continuing with reference to FIG. 1, memory device 104 also includes memory cells 120, for example, NAND cells, processing circuitry 130, and two command buffers, namely write command buffer 131 and read command buffer 135. In embodiments, processing circuitry 130 distinguishes memory commands held in host interface 105 between read and write commands, and stores each type, respectively, in the two command buffers 131 and 135. Following identification of the memory commands by type, and storage in their respective command buffers, processing circuitry 130 executes the two types of commands in sequential blocks, and thus temporally out of the order in which they first entered host interface 105. For example, in embodiments, processing circuitry 130 first executes a first pre-defined number of write memory commands from write command buffer 131. Once those write commands have been executed, processing circuitry 130 next executes a second pre-defined number of read memory commands. However, because, as shown, write command buffer is linked to memory cells 120, over links 145, but read command buffer is not, processing circuitry 130 first moves a second pre-defined number of read memory commands from read command buffer 135 to write command buffer 131, over link 141, and executes these moved read commands from write command buffer 131, thereby accessing memory cells 120 to execute the memory reads.

In alternate embodiments, read command buffer is also linked to memory cells 120, as shown by dashed line 147 (and in such alternate embodiments, read command buffer 135 need not be connected to write command buffer 131 as is illustrated by arrow 141). In such alternate embodiments, processing circuitry 130 first executes a first number of commands from write command buffer 131, and then executes a second number of read commands from read command buffer 135, without first moving any read commands from read command buffer 135 to write command buffer 131. In such alternate embodiments, processing logic 130 keeps track of how many commands are dequeued form each of the read buffer queue and the write buffer queue, and alternates execution between them, as described above.

In this manner, in embodiments, a first number of back to back write commands are executed, followed by a second number of back to back read commands, to achieve the benefits of caching. These two numbers may sometimes be referred to herein as "thresholds." In embodiments, because a write command takes a longer time to execute than a read command, the second number is made to be larger than the first. In some embodiments, the second number is from 4 to 6 times as large as the first number, so as to have approximately the same time interval for executing the set of write commands as for executing the read commands. For example, an example system may transfer 32 write commands from the host command queue to the write buffer queue, and execute those, and then transfer 160 read commands from the read buffer queue to the write buffer queue, and execute those, in one cycle. In this example, the read buffer queue may hold more commands than the block transfer size to allow, as noted above, additional read commands to continue to queue in the read buffer queue in the background, regardless of what is happening in the write buffer queue.

Further, in embodiments, under certain circumstances, there may be less than the first number of write commands in the write command buffer, and less than the second number of read commands in the read command buffer, when processing circuitry respectively proceeds to execute each of these blocks of commands. In such cases, processing circuitry 130 will execute up to the first threshold of write commands, and once those have been executed, will execute up to the second threshold of write commands, and then continue the cycle.

System 100 of FIG. 1 may, in embodiments, be implemented in firmware of memory device 104. This is next described with reference to FIGS. 2A and 2B, which illustrate alternate example firmware designs for an example SSD. The example SSD includes NAND memory cells, in accordance with various embodiments. In other embodiments, system 100 may be implemented in a SSD using any memory type where there is a significant performance difference between read and write operations. Such memory types may include, for example, 3DXP memory, NOR Flash memory and other types of non-volatile memories, such as, for example, phase change, ferroelectric, and the like.

Figure 2A:
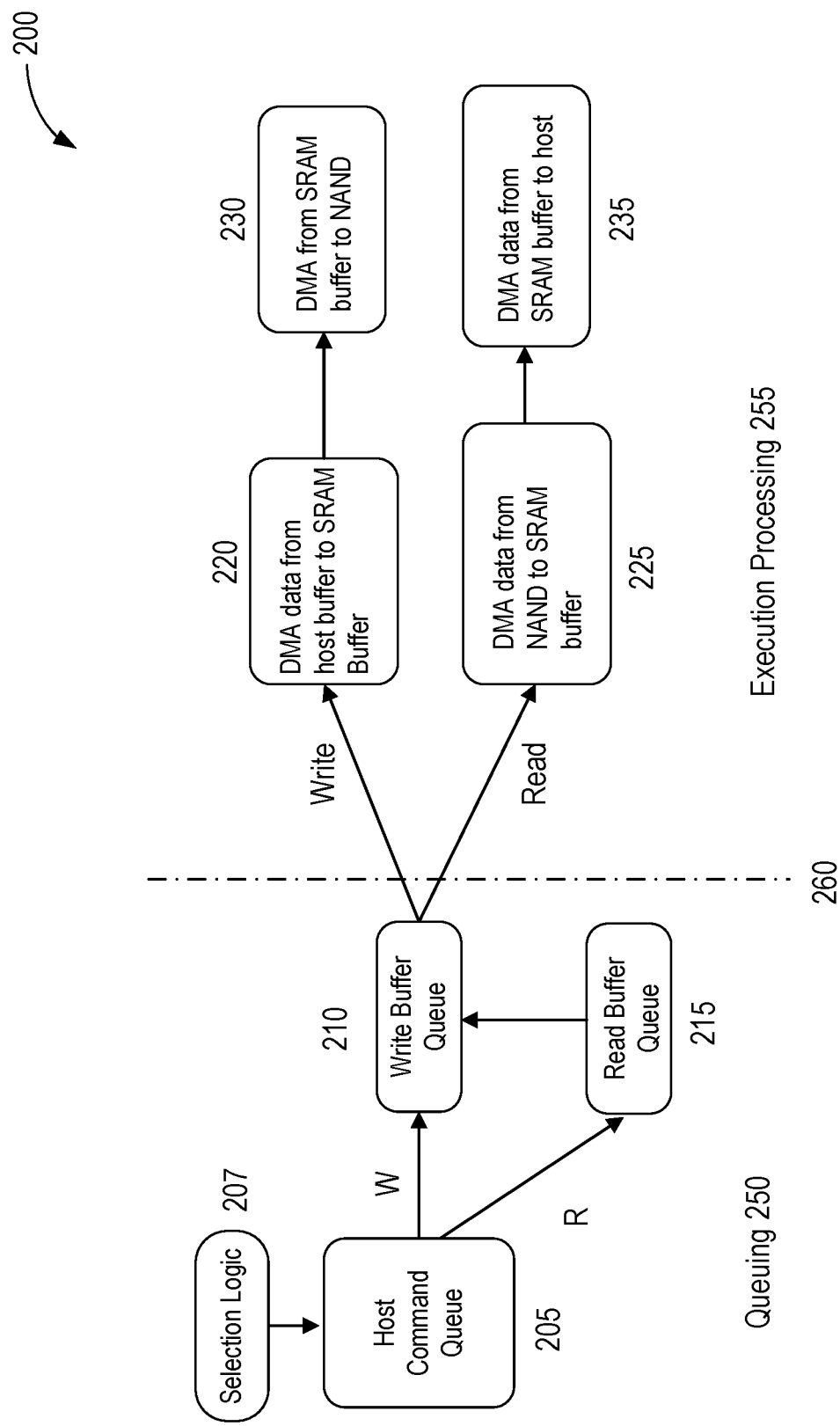
FIG. 2A illustrates an example firmware design for an example SSD, in accordance with various embodiments.

With reference to FIG. 2A, there is a queueing section 250, and an execution processing portion 255, for each of write and read memory commands. These respective sections are separated by dashed line 260. Continuing with reference to the queueing portion 250 of FIG. 2A, there is shown host command queue 205, in which memory commands received from a host computer, such as, for example, from processor 102 of FIG. 1, are initially stored. In general, such memory commands can be a mixed workload of interspersed read and write commands, as noted above. Selection logic 207, coupled to host command queue 205, analyzes the mixed commands, and distinguishes memory write commands from memory read commands, and respectively sends each of them to separate buffers, for example write buffer queue 210 and read buffer queue 215. In this exemplary firmware design, both read and write memory commands are executed from the write buffer queue (e.g., as detailed in the execution section 255). Therefore, write commands are transferred from host command queue 205 in blocks, up to a first threshold number, and executed, and no additional write commands are passed from host command queue 205. To execute read commands, once the write commands have been executed, up to a second threshold number of read commands are moved from the read buffer queue to the write buffer queue, following which this set of read commands are executed, out of the write buffer queue. Thus, the "Write" and "Read" execution pathways in FIG. 2A all emanate from write buffer queue 210, as shown by the two arrows labelled "Write" and "Read."

In order to facilitate this process of only executing memory commands out of write buffer queue 210, in alternating blocks of command type, while any command set is being executed out of write buffer queue 210, no additional write commands are passed to it by selection logic 207. Thus, while the set of read commands is being executed, no new write commands are allowed into the write buffer queue. However, because, in this example design, no commands are directly executed from read buffer queue 215, selection logic 207 may continue to pass read commands from host command queue 205 as they are received, it being understood that only a fixed number of read commands (e.g., the second pre-defined threshold) are moved out of the read buffer queue at a time, and thus not necessarily all of the read commands that may be within the read buffer queue are moved.

Thus, in embodiments, initially write commands received in the host command queue are moved to the write buffer queue and processed, while read commands are accumulated in the read buffer queue. After processing a certain number of write commands (this threshold is configurable), or, if there are no more write commands in the write buffer queue to process, the firmware stops moving write commands into the write buffer queue, and moves a pre-defined number of commands from read buffer queue to write buffer queue and executes them. Once the write buffer queue is empty, the firmware switches to executing write commands once again.

With reference to the execution section of FIG. 2A, for execution of write commands, at 220 a first direct memory access (DMA) from a host buffer to a static random access memory (SRAM) buffer on the SSD is made. This task is followed by a second DMA, at 230, from the SRAM buffer to NAND memory cells. The reason for the two stage write process is that NAND memory has a minimum transfer size, also known as a page size. Thus, data written to the NAND memory is first accumulated in an SRAM buffer on the SSD, and then transferred in complete pages to the NAND.

Similarly, for execution of read commands, at 225 a first direct memory access (DMA) from NAND to the SRAM buffer on the SSD is made. This task is followed by a second DMA, at 235, from the SRAM buffer to the host computer. The reason for the two stage read process is the same as noted above: NAND memory has a minimum transfer size, also known as a page size. Thus, data read out of the NAND memory is first transferred page by page to an SRAM buffer on the SSD, and then transferred to the host computer. In embodiments, a shared SRAM buffer may be used for both reads and writes.

Figure 2B:
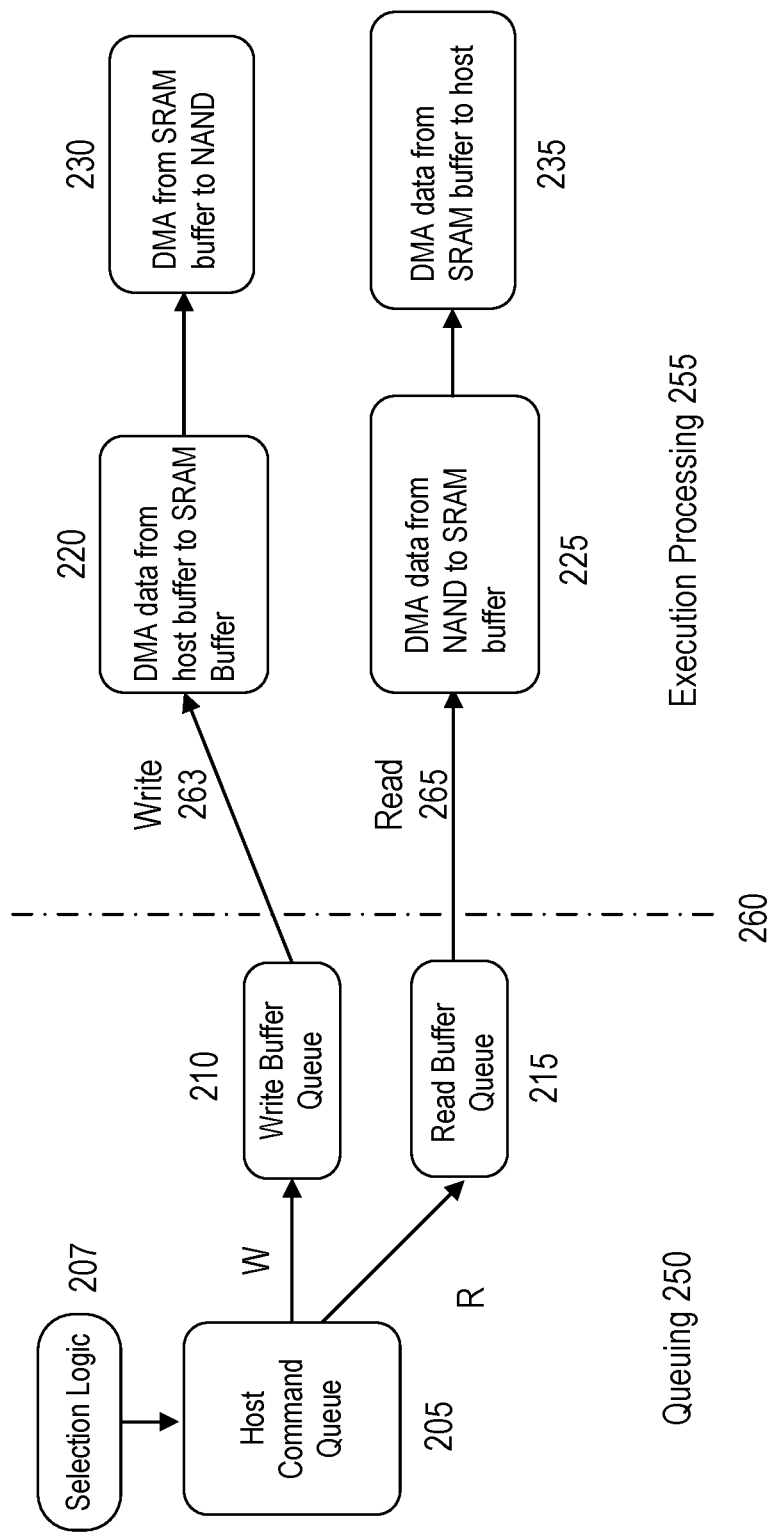
FIG. 2B illustrates the example firmware design of FIG. 2A, with a slight variation.

FIG. 2B illustrates the alternate embodiment described above with referenced to dashed line 147 in FIG. 1. FIG. 2B is identical to FIG. 2A in all respects except for two. There is no link between read buffer queue 215 and write buffer queue 210, because in this alternate exemplary firmware design, read memory commands are directly executed from read buffer queue 215, and write memory commands are executed from write buffer queue 210. Therefore, in this alternate firmware design, there is no need to move a second threshold number of read commands from read buffer queue 215 to write buffer queue 210, as is the case in the example firmware design of FIG. 2A, described above. Thus, the "Write" and "Read" execution pathways in FIG. 2B each respectively emanate directly from write buffer queue 210 and read buffer queue 215, as shown by the two arrows labelled "Write" 263 and "Read" 265. As noted above, in the alternate firmware design of FIG. 2B, a first number of write commands from write buffer queue 210 is executed, and then a second number of read commands from read buffer queue 215 are executed. In such alternate embodiments, execution processing 255 of the firmware keeps track of how many commands are dequeued from each of the read buffer queue and the write buffer queue during execution blocks, and alternates execution between them.

Figure 3:
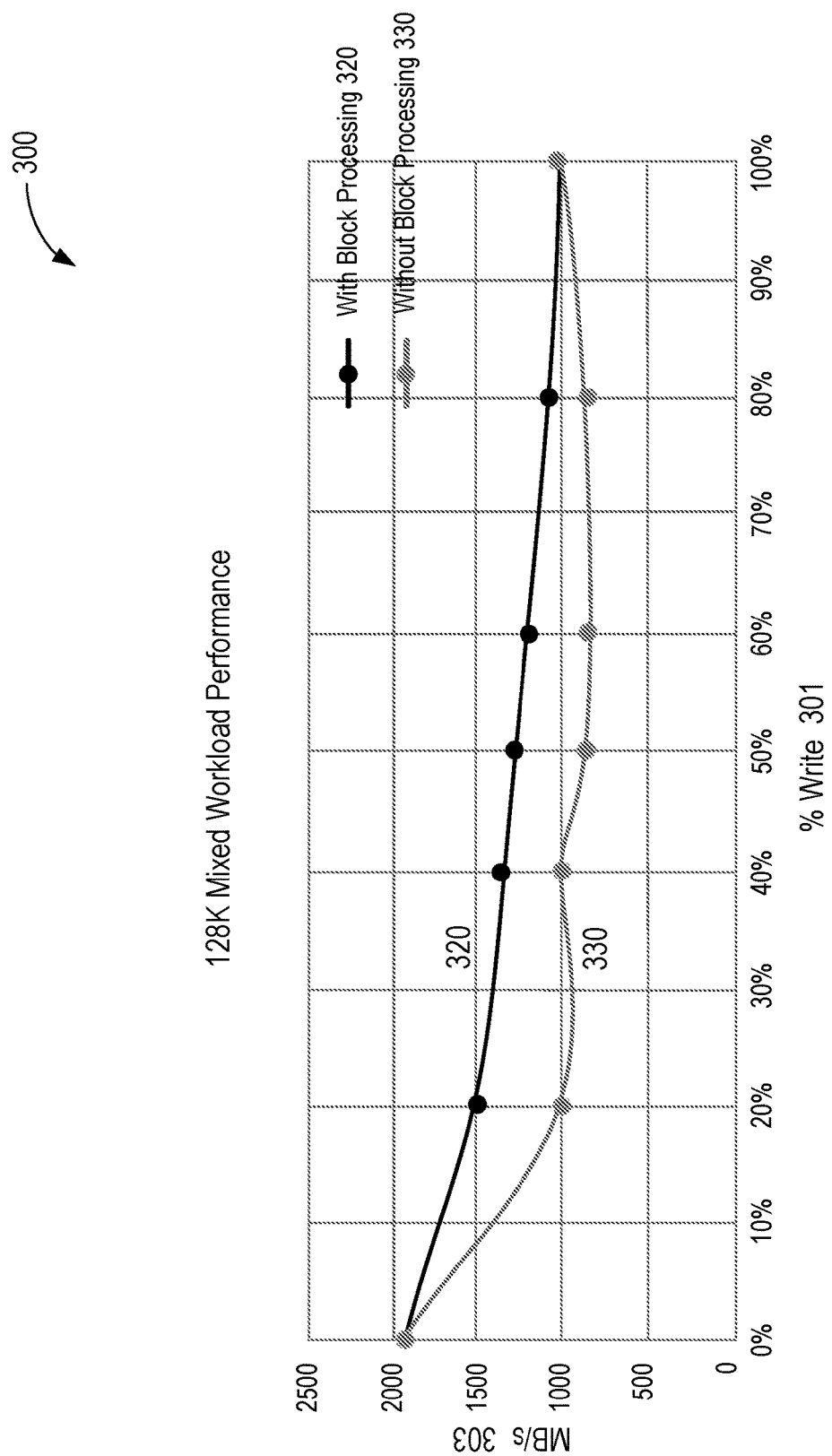
FIG. 3 is a comparison of performance versus workload mix for an example SSD with and without implementation of an example embodiment.

FIG. 3 is a comparison of performance versus workload mix for an example SSD with and without implementation of an example embodiment as described herein. With reference thereto, two plots of throughput, in megabytes per second (MB/s) 303 are shown, for a memory device that implements the separation and block processing of memory commands in accordance with various embodiments (shown in plot 320), and for a standard memory device that does not (shown in plot 330). As shown, each of plots 320 and 330 span a range of memory command workloads, from all read commands at the far left (=0% write commands) to all write commands at the far right of the figure. At each extreme both implementations have identical results, as the full benefits of caching are available. However, for any type of mixed workload, from mostly read commands at the left of FIG. 3 to mostly write commands at the far right of the figure, there is a significant benefit to implement the separation and block processing techniques as described herein. For example, for a mixed workload of 20% write/80% read, there is a 50% increase in memory throughput, as shown.

Figure 4:
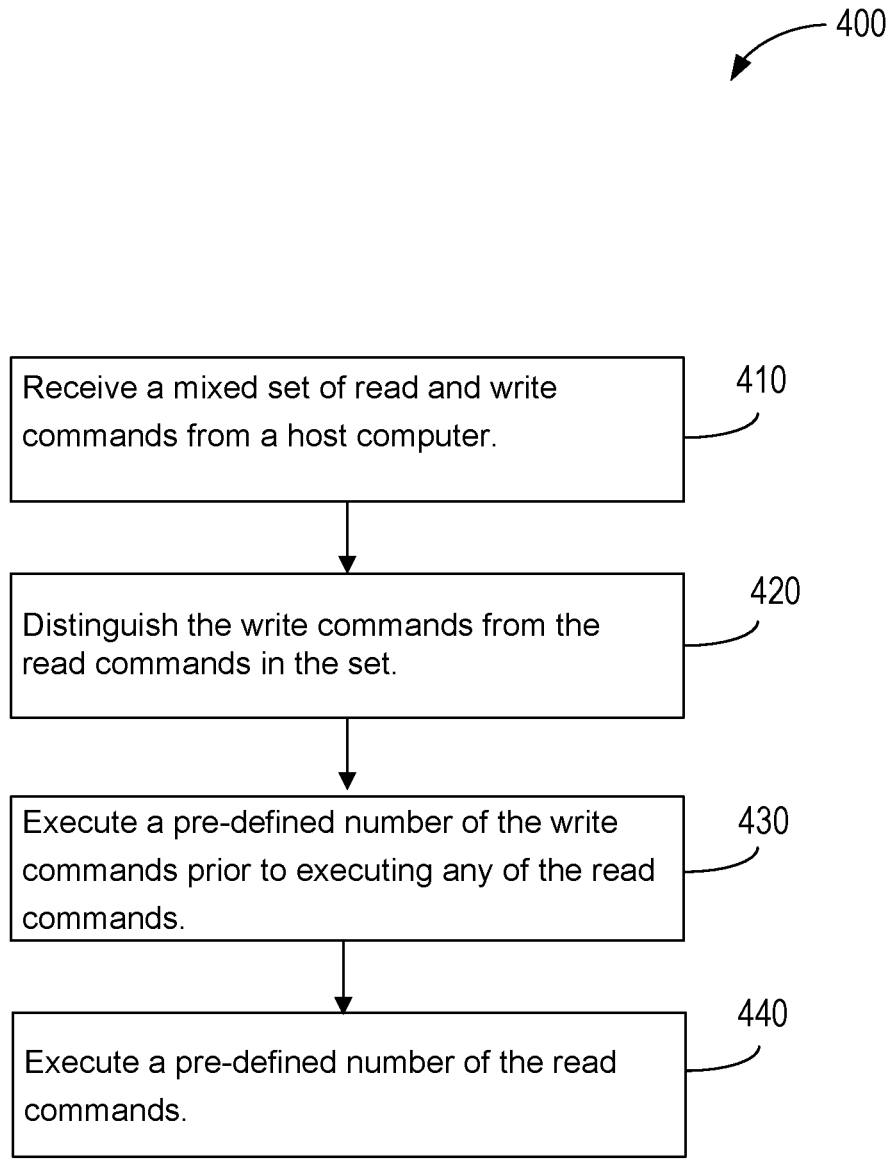
FIG. 4 illustrates an overview of the operational flow of a process for separating a memory workload into read and write commands and executing a pre-defined number of write commands prior to executing any read commands, in accordance with various embodiments.

FIG. 4 illustrates process flow of an example process 400 for separating and separately processing, write commands and memory commands received from a host computer, in accordance with various embodiments. In embodiments, process 400 may be performed by processing circuitry 130 of FIG. 1, including by interacting with host interface 105 of FIG. 1, or, for example, by the firmware illustrated in FIG. 2, including, for example, selection logic 207, and execution processing 255. Process 400 is illustrated by a process flow as shown in FIG. 4 including blocks 410 through 440. In embodiments, process 400 may have greater, or fewer, blocks.

Process 400 begins at block 410, where a memory device, such as a SSD, receives a mixed set of read and write commands from a host computer, known as a "mixed workload."

From block 410, process 400 proceeds to block 420, where the write memory commands are distinguished from the read memory commands in the set. For example, while in an initial queue, such as host command queue 205 of FIG. 2, selection logic 207 may tag each type of command with an identifier that is distinct as to command type. From block 420, process 400 proceeds to block 430, where a pre-defined number of the write commands are executed prior to executing any of the read commands. From block 430, process 400 proceeds to block 430, where a pre-defined number of the read commands are executed.

Figure 5:
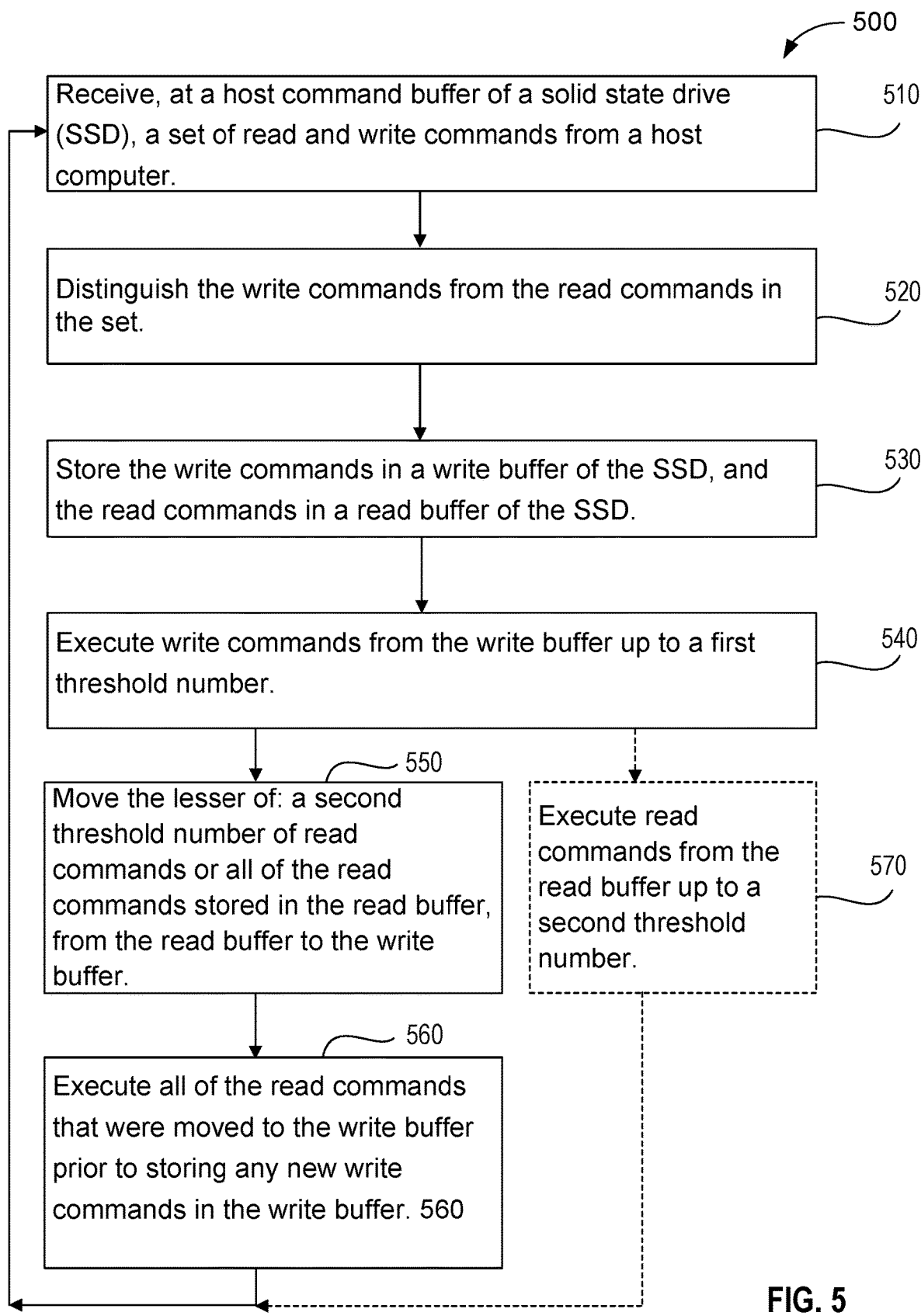
FIG. 5 illustrates an overview of the operational flow of a process for receiving at a SSD a set of read and write commands, separating them by command type in different buffers, executing write commands up to a threshold number, and executing a set of read commands, in accordance with various embodiments.

FIG. 5 illustrates process flow of an example process 500 for receiving, at a SSD, a set of mixed read and write memory commands from a host computer, separating them into read and write queues, and separately processing commands from each queue up to a pre-defined threshold number of commands, in accordance with various embodiments. In embodiments, process 500 may be performed by processing circuitry 130 of FIG. 1, including by interacting with host interface 105, write command buffer, read command buffer, and memory cells 120, all of FIG. 1. Or, for example, process 500 may be performed by the firmware illustrated in FIGS. 2A and 2B, including, for example, selection logic 207, and execution processing 255. Process 500 is illustrated by a process flow as shown in FIG. 5 including blocks 510 through 560, or in an alternate version (shown in dashed lines), by a process flow from blocks 510 through 540, and block 570. In embodiments, process 500 may have greater, or fewer, blocks. In embodiments, one or more of blocks 510 through 560 may be performed in parallel with other blocks, or in a different sequence than shown.

Process 500 begins at block 510, where a SSD receives a mixed set of read and write commands from a host computer.

From block 510, process 500 proceeds to block 520, where write commands in the set are distinguished from the read commands, such as, for example, by selection logic 207 of FIG. 2. From block 520, process 500 proceeds to block 530, where the write commands are stored in a write buffer of the SSD, and the read commands are stored in a read buffer of the SSD.

From block 530, process 500 proceeds to block 540, where, write commands up to a pre-defined threshold number are executed from the write buffer. From block 540, process 500 may take one of two alternate pathways, respectively illustrating an embodiment as shown in FIG. 2A, and an alternate embodiment as shown in FIG. 2B. The embodiment of FIG. 2A will be first described. In this embodiment, from block 540, process 500 proceeds to block 550, where the lesser of: a second threshold number of read commands, or all of the read commands stored in the read buffer, are moved from the read buffer to the write buffer. From block 550, process 500 proceeds to block 560, where all of the read commands that were moved to the write buffer are executed prior to storing any new write commands in the write buffer. From block 560, process 500 returns to block 510, where another cycle of selection and block processing of write and read memory commands begins. As described above, in embodiments, a read command received in the host command buffer of the SSD may, upon identification as such, always be passed to the read buffer. Thus, at block 530, read commands may be queued prior to write commands, if the write buffer is then either executing a full complement of write commands, or is occupied with execution of read commands.

Next described is an alternate pathway for process 500 following block 540, which includes block 570, and does not include blocks 550 and 560. The alternate pathway implements processing as illustrated in FIG. 2B, and is shown in FIG. 5 using dashed arrows and boxes. This alternate pathway is next described. From block 540, process 500 proceeds to block 570, where read commands are executed up to a second threshold number from the read buffer. From block 570, process 500 returns to block 510, where another cycle of selection and block processing of write and read memory commands begins.

Figure 6:
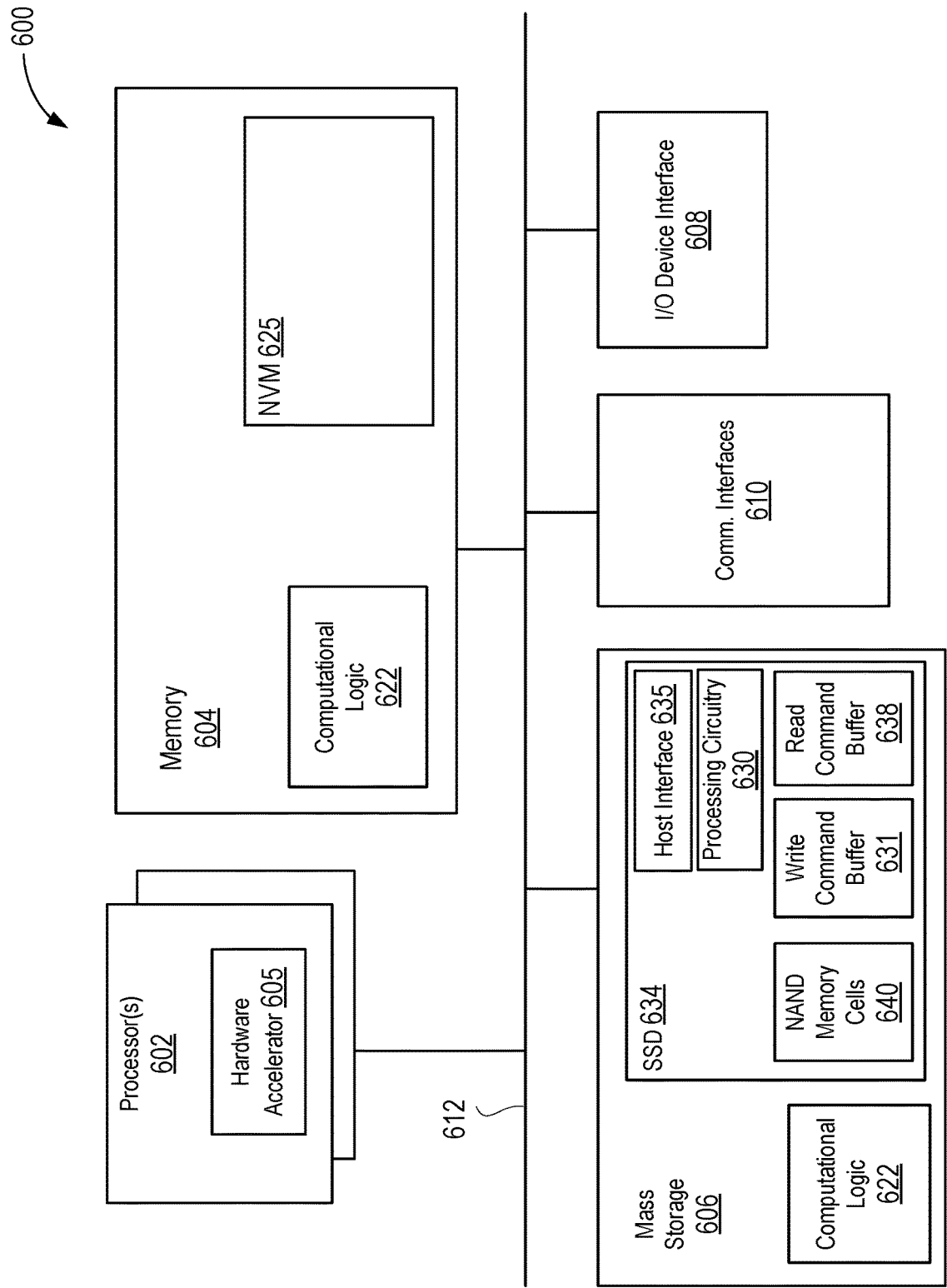
FIG. 6 illustrates a block diagram of a computer device suitable for practicing the present disclosure, in accordance with various embodiments.

Referring now to FIG. 6 wherein a block diagram of a computer device suitable for practicing the present disclosure, in accordance with various embodiments, is illustrated. As shown, computer device 600 may include one or more processors 602 and system memory 604. Each processor 602 may include one or more processor cores, and hardware accelerator 605. An example of hardware accelerator 605 may include, but is not limited to, programmed field programmable gate arrays (FPGA). In embodiments, processor 602 may also include a memory controller (not shown) to interact with memory 604. In embodiments, system memory 604 may include any known volatile or non-volatile memory, including, for example, NVM 625.

Additionally, computer device 600 may include mass storage device(s) 606, such as SSD 634. SSD 634 may include NAND memory cells 640, host interface 635, processing circuitry 630, write command buffer 631 and read command buffer 638. Processing circuitry 630, write command buffer 631 and read command buffer 638, are each similar to processing circuitry 130, write command buffer 131, and read command buffer 135, respectively, shown in FIG. 1, and described above. As described above, in accordance with various embodiments, processing circuitry 630 may separate a set of mixed memory commands received from a host, through host interface 635, and respectively store them in write command buffer 631, and read command buffer 638. Processing circuitry may additionally execute a pre-defined threshold of the write commands prior to executing any of the read commands in the set of mixed memory commands. In embodiments, the pre-defined threshold may be a first threshold number, and the processing circuitry may execute write commands from the write buffer up to the first threshold number, move the lesser of a second threshold number of read commands or all of the read commands stored in the read buffer, from the read buffer to the write buffer, and execute the read commands that were moved to the write buffer. In embodiments, the second pre-defined threshold is larger than the first pre-defined threshold, and the ratio of the second threshold to the first threshold is a real number between 4 and 6.

Computer device 600 may include input/output device interface 608 (to interface with various input/output devices, such as, mouse, cursor control, display device (including touch sensitive screen), and so forth) and communication interfaces 610 (such as network interface cards, modems and so forth). In embodiments, communication interfaces 610 may support wired or wireless communication, including near field communication. The elements may be coupled to each other via system bus 612, which may represent one or more buses. In the case of multiple buses, they may be bridged by one or more bus bridges (not shown).

In embodiments, system memory 604 and mass storage device(s) 606 may be employed to store a working copy and a permanent copy of the executable code of the programming instructions of an operating system, one or more applications, and/or various software implemented components of processor 102, host interface 105, processing circuitry 130, all of FIG. 1, host command queue 205, write buffer queue 210 and read buffer queue 215, and the various processes involved in execution 255, all of FIGS. 2A and 2B, process 400 of FIG. 4 and process 500 of FIG. 5, collectively referred to as computational logic 622. The programming instructions implementing computational logic 622 may comprise assembler instructions supported by processor(s) 602 or high-level languages, such as, for example, C, that can be compiled into such instructions. In embodiments, some of computing logic may be implemented in hardware accelerator 605. In embodiments, part of computational logic 622, e.g., a portion of the computational logic 622 associated with the runtime environment of the compiler, may be implemented in hardware accelerator 605.

The permanent copy of the executable code of the programming instructions or the bit streams for configuring hardware accelerator 605 may be placed into permanent mass storage device(s) 606 and/or hardware accelerator 605 in the factory, or in the field, through, for example, a distribution medium (not shown), such as a compact disc (CD), or through communication interface 610 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 610-640 may vary, depending on the intended use of example computer device 600, e.g., whether example computer device 600 is a smartphone, a tablet, an ultrabook, a laptop, a server, a set-top box, a game console, a camera, and so forth. The constitutions of these elements 610-640 are otherwise known, and accordingly will not be further described.

Figure 7:
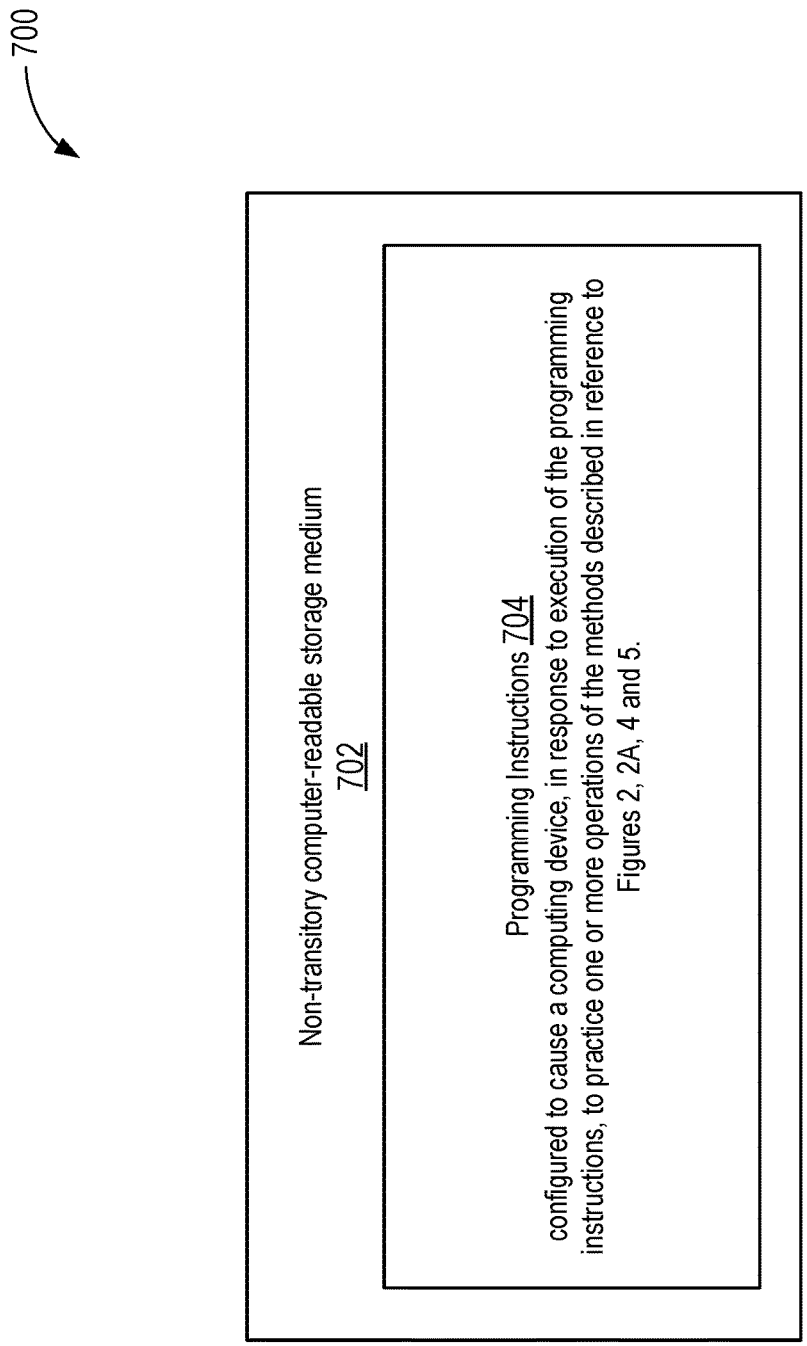
FIG. 7 illustrates an example computer-readable storage medium having instructions configured to practice aspects of the processes of FIGS. 2, 4 and 5, in accordance with various embodiments.

FIG. 7 illustrates an example computer-readable storage medium having instructions configured to implement all (or portion of) software implementations of processor 102, host interface 105 and processing circuitry 130, all of FIG. 1, FIG. 2A, FIG. 2B, and/or practice (aspects of) processes performed by processor 102, host interface 105 and processing circuitry 130, all of FIG. 1, host command queue 205, write buffer queue 210 and read buffer queue 215, all shown in each of FIGS. 2A and 2B, the various processes involved in execution 255 illustrated in each of FIGS. 2A and 2B, respectively, process 400 of FIG. 4 and process 500 of FIG. 5, earlier described, in accordance with various embodiments. As illustrated, computer-readable storage medium 702 may include the executable code of a number of programming instructions or bit streams 704. Executable code of programming instructions (or bit streams) 704 may be configured to enable a device, e.g., computer device 600, in response to execution of the executable code/programming instructions (or operation of an encoded hardware accelerator 605), to perform (aspects of) processes performed by processor 105 of FIG. 1, the various processes involved in execution 255 illustrated in each of FIGS. 2A and 2B, respectively, process 400 of FIG. 4 and process 500 of FIG. 5. In alternate embodiments, executable code/programming instructions/bit streams 704 may be disposed on multiple non-transitory computer-readable storage medium 702 instead. In embodiments, computer-readable storage medium 702 may be non-transitory. In still other embodiments, executable code/programming instructions 704 may be encoded in transitory computer readable medium, such as signals.

Referring back to FIG. 6, for one embodiment, at least one of processors 602 may be packaged together with a computer-readable storage medium having some or all of computing logic 622 (in lieu of storing in system memory 604 and/or mass storage device 606) configured to practice all or selected ones of the operations earlier described with reference to FIGS. 2A, 2B, 4 and 5. For one embodiment, at least one of processors 602 may be packaged together with a computer-readable storage medium having some or all of computing logic 622 to form a System in Package (SiP). For one embodiment, at least one of processors 602 may be integrated on the same die with a computer-readable storage medium having some or all of computing logic 622. For one embodiment, at least one of processors 602 may be packaged together with a computer-readable storage medium having some or all of computing logic 622 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

EXAMPLES

Example 1 is an apparatus for controlling a solid state drive (SSD), comprising: a host interface, to receive a set of memory access commands from a host computer; and processing circuitry coupled to the host interface and to memory cells of the SSD, to distinguish the write commands from the read commands in the set, and execute up to a threshold number of the write commands prior to executing any of the read commands.

Example 2 is the apparatus of example 1, further comprising a write buffer and a read buffer, and wherein the processing circuitry is further to store the write commands in the write buffer, and the read commands in the read buffer.

Example 3 is the apparatus of example 2, wherein the threshold number is a first threshold number, and wherein the processing circuitry is further to: execute the write commands from the write buffer up to the first threshold number, and move a second threshold number of read commands stored in the read buffer from the read buffer to the write buffer.

Example 4 is the apparatus of example 3, wherein the processing circuitry is further to execute all of the read commands that were moved to the write buffer prior to storing any new write commands in the write buffer.

Example 5 is the apparatus of example 3, wherein the second threshold is greater than the first threshold.

Example 6 is the apparatus of example 3, wherein the ratio of the second threshold to the first threshold is a rational number between 4 and 6.

Example 7 is the apparatus of example 1, wherein the set of memory access commands includes both write commands and read commands.

Example 8 is the apparatus of example 1, wherein the threshold number is a first threshold number, and wherein the processing circuitry is further to determine if no write commands are included in the set, and in response to the determination, execute up to a second threshold number of the read commands in the set.

Example 9 is the or more non-transitory computer-readable storage media comprising a set of instructions, which, when executed by a SSD controller coupled to memory cells of a SSD, cause the SSD controller to: receive a set of read and write commands from a host computer; distinguish between the write commands and the read commands in the set, and execute up to a threshold number of the write commands prior to executing any of the read commands.

Example 10 is the one or more non-transitory computer-readable storage media of example 9, further comprising instructions, that when executed, cause the SSD controller to store the write commands in a write buffer of the SSD, and the read commands in a read buffer of the SSD.

Example 11 is the one or more non-transitory computer-readable storage media of example 10, wherein the threshold number is a first threshold number, and further comprising instructions, that when executed, cause the SSD controller to: execute write commands from the write buffer up to the first threshold number; and move the lesser of: a second threshold number of read commands or all of the read commands stored in the read buffer, from the read buffer to the write buffer.

Example 12 is the one or more non-transitory computer-readable storage media of example 11, further comprising instructions, that when executed, cause the SSD controller to: execute all of the read commands that were moved to the write buffer prior to storing any new write commands in the write buffer.

Example 13 is one or more non-transitory computer-readable storage media of example 11, wherein the second threshold number is larger than the first threshold number.

Example 14 is the one or more non-transitory computer-readable storage media of example 9, wherein the set of memory access commands includes both write commands and read commands.

Example 15 is the one or more non-transitory computer-readable storage media of example 11, wherein the ratio of the second threshold number to the first threshold number is a rational number between 4 and 6.

Example 16 is the one or more non-transitory computer-readable storage media of example 9, wherein the threshold number is a first threshold number, and further comprising instructions, that when executed, cause the SSD controller to: determine if no write commands have been received from the host computer, and in response to the determination, execute up to a second threshold number of the read commands in the set.

Example 17 is a memory device, comprising: a NAND die including at least one memory cell; and a solid state drive (SSD) controller, comprising: an host interface, to receive a set of memory access commands from a host computer; and processing circuitry coupled to the host interface and to the at least one memory cell, to distinguish the write commands from the read commands in the set, and execute up to a threshold number of the write commands prior to executing any of the read commands.

Example 18 is the memory device of example 17, the SSD controller further comprising: a write buffer and a read buffer, wherein the threshold number is a first threshold number, and wherein the processing circuitry is further to: store the write commands in the write buffer, and the read commands in the read buffer, and first execute the write commands from the write buffer up to the first threshold number, and next move the lesser of a second threshold number and all of the of read commands in the read buffer, from the read buffer to the write buffer.

Example 19 is the memory device of example 18, the processing circuitry of the SSD controller further to: execute all of the read commands that were moved to the write buffer prior to storing any new write commands from the host computer in the write buffer; and continue to store new read from the host computer in the read buffer.

Example 20 is the memory device of example 18, wherein the ratio of the second threshold to the first threshold is a rational number between 4 and 6.

Example 21 is an apparatus for computing, comprising: means for receiving a set of read and write commands from a host computer; means for distinguishing between the write commands and the read commands in the set, and means for executing up to a threshold number of the write commands prior to executing any of the read commands.

Example 22 is the apparatus for computing of example 21, further comprising means for storing the write commands in a write buffer of a coupled SSD, and the read commands in a read buffer of the coupled SSD.

Example 23 is the apparatus for computing of example 22, wherein the threshold number is a first threshold number, and further comprising means for executing write commands from the write buffer up to the first threshold number;

and means for moving the lesser of: a second threshold number of read commands or all of the read commands stored in the read buffer, from the read buffer to the write buffer.

Example 24 is the apparatus for computing of example 23, further comprising means for executing all of the read commands that were moved to the write buffer prior to the means for storing having stored any new write commands in the write buffer.

Example 25 is the apparatus for computing of example 23, wherein the second threshold number is larger than the first threshold number.

Example 26 is the apparatus for computing of example 21, wherein the set of memory access commands includes both write commands and read commands.

Example 27 is the apparatus for computing of example 23, wherein the ratio of the second threshold number to the first threshold number is a rational number between 4 and 6.

Example 28 is the apparatus for computing of example 21, wherein the threshold number is a first threshold number, and further comprising means for determining if no write commands have been received from the host computer, and in response to the determination, the means for executing to execute up to a second threshold number of the read commands in the set.

Example 29 is a method of controlling a SSD, comprising: receiving a set of read and write commands from a host computer; distinguishing between the write commands and the read commands in the set, and executing up to a threshold number of the write commands prior to executing any of the read commands.

Example 30 is the method of example 29, further comprising storing the write commands in a write buffer of a coupled SSD, and the read commands in a read buffer of the coupled SSD.

Example 31 is the method of example 29, wherein the threshold number is a first threshold number, and further comprising: executing write commands from the write buffer up to the first threshold number; and moving the lesser of: a second threshold number of read commands or all of the read commands stored in the read buffer, from the read buffer to the write buffer.

Example 32 is the method of example 31, further comprising: executing all of the read commands that were moved to the write buffer prior to storing any new write commands in the write buffer.

Example 33 is the method of example 31, wherein the second threshold number is larger than the first threshold number, and wherein the ratio of the second threshold number to the first threshold number is a rational number between 4 and 6.

Example 34 is the method of example 29, wherein the threshold number is a first threshold number, and further comprising determining if no write commands have been received from the host computer, and in response to the determination, executing up to a second threshold number of the read commands in the set.

What is claimed is:

1. An apparatus for controlling a solid state drive (SSD), comprising:
    a host interface, to receive a set of memory access commands from a host computer;
    processing circuitry including at least one electrically conductive element coupled to the host interface and to memory cells of the SSD, to:
        distinguish write commands in the set from read commands in the set;
        store the write commands in a write buffer, and store the read commands in a read buffer;
        execute up to a first threshold number of the write commands prior to executing any of the read commands; and
        move a second threshold number of read commands stored in the read buffer from the read buffer to the write buffer, wherein both the read commands and the write commands are to follow a path for execution out of the write buffer and the processing circuitry is further to execute all of the read commands that were moved to the write buffer prior to storing any new write commands in the write buffer.

2. The apparatus of claim 1, further comprising the write buffer and the read buffer.

3. The apparatus of claim 1, wherein the second threshold is greater than the first threshold.

4. The apparatus of claim 1, wherein the ratio of the second threshold to the first threshold is a rational number between 4 and 6.

5. The apparatus of claim 1, wherein the set of memory access commands includes both write commands and read commands.

6. The apparatus of claim 1, wherein the processing circuitry is further to determine if no write commands are included in the set, and in response to the determination, execute up to the second threshold number of the read commands in the set.

7. One or more non-transitory computer-readable storage media comprising a set of instructions, which, when executed by a solid state drive (SSD) controller coupled to memory cells of a SSD, cause the SSD controller to:
    receive a set of read and write commands from a host computer;
    distinguish between write commands in the set and read commands in the set;
    store the write commands in a write buffer of the SSD, and the read commands in a read buffer of the SSD;
    execute up to a first threshold number of the write commands prior to executing any of the read commands;
    move a second threshold number of read commands stored in the read buffer from the read buffer to the write buffer, wherein both the read commands and the write commands are to follow a path for execution out of the write buffer; and
    execute all of the read commands that were moved to the write buffer prior to storing any new write commands in the write buffer.

8. The one or more non-transitory computer-readable storage media of claim 7, wherein the second threshold number is larger than the first threshold number.

9. The one or more non-transitory computer-readable storage media of claim 7, wherein the set of memory access commands includes both write commands and read commands.

10. The one or more non-transitory computer-readable storage media of claim 7, wherein the ratio of the second threshold number to the first threshold number is a rational number between 4 and 6.

11. The one or more non-transitory computer-readable storage media of claim 7, further comprising instructions, that when executed, cause the SSD controller to: determine if no write commands have been received from the host computer, and in response to the determination, execute up to a second threshold number of the read commands in the set.

12. A memory device, comprising:
a NAND die including at least one memory cell; and
a solid state drive (SSD) controller, comprising:
- a host interface, to receive a set of memory access commands from a host computer; and
- processing circuitry coupled to the host interface and to the at least one memory cell, to
- distinguish write commands in the set from read commands in the set;
- store the write commands in a write buffer, and store the read commands in a read buffer; and
- execute up to a first threshold number of the write commands prior to executing any of the read commands;
- move a second threshold number of read commands stored in the read buffer from the read buffer to the write buffer, wherein both the read commands and the write commands are to follow a path for execution out of the write buffer; and
- execute all of the read commands that were moved to the write buffer prior to storing any new write commands from the host computer in the write buffer.

13. The memory device of claim 12, the SSD controller further comprising the write buffer and the read buffer.

14. The memory device of claim 12, wherein the processing circuitry of the SSD controller is further to:
continue to store new read commands from the host computer in the read buffer.

15. The memory device of claim 12, wherein the ratio of the second threshold to the first threshold is a rational number between 4 and 6.

* * * * *